United States Patent
Brown et al.

(10) Patent No.: US 7,636,723 B2
(45) Date of Patent: Dec. 22, 2009

(54) METHOD AND COMPUTER-READABLE MEDIUM FOR JOINTLY MANAGING DIGITAL ASSETS AND NON-DIGITAL ASSETS

(75) Inventors: Kevin Lane Brown, Woodinville, WA (US); Jason M. Cahill, Woodinville, WA (US); Adrian Fanaru, Sammamish, WA (US); Ethan D. Gur-esh, Seattle, WA (US); Moshe R. Lutz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 11/123,434

(22) Filed: May 6, 2005

(65) Prior Publication Data

US 2006/0253357 A1    Nov. 9, 2006

(51) Int. Cl.
    G06F 17/00    (2006.01)
(52) U.S. Cl. .................... 707/100; 715/201
(58) Field of Classification Search ............... None
    See application file for complete search history.

(56) References Cited

U.S. PATENT DOCUMENTS

| | | | | |
|---|---|---|---|---|
| 5,159,180 A * | 10/1992 | Feiler | ......................... | 235/375 |
| 5,412,190 A * | 5/1995 | Josephson et al. | ............. | 705/45 |
| 5,586,235 A * | 12/1996 | Kauffman | .................... | 715/500 |
| 5,813,009 A * | 9/1998 | Johnson et al. | ............. | 707/100 |
| 5,920,700 A * | 7/1999 | Gordon et al. | ............... | 709/226 |
| 6,189,008 B1 * | 2/2001 | Easty et al. | .................... | 707/10 |
| 6,222,530 B1 * | 4/2001 | Sequeira | ................... | 715/500.1 |
| 6,289,460 B1 * | 9/2001 | Hajmiragha | ................. | 726/28 |
| 6,321,231 B1 * | 11/2001 | Jebens et al. | ............. | 707/104.1 |
| 6,332,146 B1 * | 12/2001 | Jebens et al. | ............. | 707/104.1 |
| 6,378,130 B1 * | 4/2002 | Adams | ......................... | 725/95 |
| 6,947,959 B1 * | 9/2005 | Gill | .......................... | 715/501.1 |
| 7,051,157 B2 | 5/2006 | James | | |
| 7,146,388 B2 * | 12/2006 | Stakutis et al. | ............... | 707/204 |
| 7,198,210 B2 * | 4/2007 | Kusters | ....................... | 241/30 |
| 7,281,019 B2 | 10/2007 | Taketa et al. | | |
| 2003/0101072 A1 | 5/2003 | Dick et al. | | |
| 2003/0105738 A1 * | 6/2003 | Taketa et al. | .................... | 707/1 |

(Continued)

OTHER PUBLICATIONS

Copending U.S. Appl. No. 11/107,067, filed Apr. 15, 2005, entitled "Method and Computer-Readable Medium for Providing an Official File Repository".

(Continued)

*Primary Examiner*—Miranda Le
*Assistant Examiner*—Hubert Cheung
(74) *Attorney, Agent, or Firm*—Merchant & Gould PC

(57) ABSTRACT

A method and computer-readable medium are provided for jointly managing digital assets and non-digital assets. According to the method, a database is maintained that includes one or more digital assets and records corresponding to one or more non-digital assets. A request may be received to perform an action on an asset identified in the database. In response to the request, a determination is made as to whether the request is to perform an action on a digital or non-digital asset. If the request is to perform an action on a digital asset, a first workflow is performed for completing the action on the digital asset. If the request is to perform an action on a non-digital asset, a second workflow is performed for completing the requested action on the non-digital asset.

8 Claims, 6 Drawing Sheets

U.S. PATENT DOCUMENTS

| | | | |
|---|---|---|---|
| 2003/0212862 A1 | 11/2003 | James | 711/115 |
| 2004/0091114 A1 | 5/2004 | Carter et al. | 380/259 |
| 2004/0236770 A1* | 11/2004 | Lee et al. | 707/100 |
| 2005/0066190 A1* | 3/2005 | Martin | 713/200 |
| 2005/0076042 A1* | 4/2005 | Stakutis et al. | 707/100 |
| 2006/0097089 A1* | 5/2006 | Marie Kusters | 241/30 |
| 2006/0178902 A1* | 8/2006 | Vicars et al. | 705/1 |
| 2006/0235891 A1* | 10/2006 | Brown et al. | 707/200 |

OTHER PUBLICATIONS

U.S. Office Action dated Aug. 29, 2008 cited in U.S. Appl. No. 11/107,067.

* cited by examiner

METHOD AND COMPUTER-READABLE MEDIUM FOR JOINTLY MANAGING DIGITAL ASSETS AND NON-DIGITAL ASSETS

I. RELATED APPLICATIONS

This patent application is related to application Ser. No. 11/107,067, filed on Apr. 15, 2005, entitled "METHOD AND COMPUTER-READABLE MEDIUM FOR PROVIDING AN OFFICIAL FILE REPOSITORY" which is assigned to the same assignee as this application.

II. BACKGROUND OF THE INVENTION

Business organizations have historically generated an enormous quantity of physical records (also referred to herein as "non-digital assets"). Physical records include paper documents, files, and records, and also include non-paper items such as boxes, hardware prototypes, video tapes, compact disks, digital versatile disks, and other types of physical items. These items are typically archived in file rooms, warehouses, or other types of storage locations.

Because many business organizations are subject to various legal, industry standard, and regulatory record-keeping requirements, many organizations utilize a document management system to keep track of the location of their non-digital assets. Document management systems typically maintain an inventory of the non-digital assets and their physical location. Other functions, such as checking a non-digital asset in or out, may also be performed by the document management system.

Since the start of the modern computing era, business organizations have also been generating copious numbers of digital assets. Digital assets may include any type of digital information, such as digital documents, images, electronic mail messages, and others. The legal, industry standard, and regulatory record-keeping requirements also apply to an organization's digital assets. Accordingly, many organizations utilize a digital records management solution to manage the utilization, destruction, and archival of digital assets.

Today's document and digital records management solutions suffer from several serious drawbacks. In particular, none of today's solutions offer a unified system to manage both digital and non-digital assets. As a result, many organizations have systems in place for managing non-digital assets that are completely separate from their digital records management solutions. This results in extra expense necessary to maintain and utilize two different asset management systems. Moreover, because the two systems are completely separate, it is difficult to enforce policies (i.e. a retention policy) on related digital and non-digital assets.

It is with respect to these considerations and others that the various embodiments of the present invention have been made.

III. SUMMARY OF THE INVENTION

In accordance with the present invention, the above and other problems are solved by a method and computer-readable medium for jointly managing digital assets and non-digital assets. Through the use of the various embodiments of the invention, organizations may more easily manage both digital and non-digital assets within a single, unified computing environment. Moreover, management policies and other actions may be easily created and applied to related digital and non-digital assets.

According to one aspect of the invention, a method is provided for jointly managing digital and non-digital assets. According to the method, a database is maintained that includes one or more digital assets and one or more records corresponding to non-digital assets. The records corresponding to the non-digital assets may include properties unique to non-digital assets, such as information describing a physical location where the non-digital asset is stored (e.g. the warehouse, aisle, and shelf number where the box is stored) and information describing a type for the non-digital asset (e.g. whether the asset is a hardware device, CD, box, etc.).

A request may be received to perform an action on an asset identified in the database. For instance, a user may request that an asset be checked out for use. In response to the request, a determination is made based on the contents of the database as to whether the request is to perform the action on a digital or non-digital asset. If the request is to perform an action on a digital asset, a first workflow is performed for completing the action on the digital asset. If the request is to perform an action on a non-digital asset, a second workflow is performed for completing the requested action on the non-digital asset.

According to the various embodiments of the invention, the request to perform an action may be user-initiated or system-initiated. If the request is user-initiated, a determination may be made as to whether the action is to be performed on a digital or a non-digital asset. If the action is to be performed on a non-digital asset, one or more possible actions that may be performed on non-digital assets are identified. The possible actions may then be displayed to the user and a selection may be received from the user of the action to be performed. In this manner, only the actions that can be performed on non-digital items are made available to users when a request is made to perform an action on a non-digital item. A similar process may be performed for identifying to a user only those actions that may be performed on a digital asset when a request is received to perform an action on a digital asset.

According to other embodiments of the invention, related digital and non-digital assets may be linked to one another in the database. In this manner, when an action is performed on a digital asset, the same action may be performed on a related non-digital asset and vice versa. More specifically, if a request is received to perform an action on a non-digital asset, a determination may be made as to whether the record in the database corresponding to the non-digital asset is linked to a digital asset. If the non-digital asset is linked to a digital asset, a workflow may be executed for performing the requested action on the digital asset. Similarly, if a request is received to perform an action on a digital asset, a determination may be made as to whether the digital asset is linked to a record corresponding to a non-digital asset. If the digital asset is linked to a record corresponding to a non-digital asset, a workflow may be executed for performing the requested action on the non-digital asset.

According to another embodiment of the invention, a computer-readable medium is provided having computer-executable instructions stored thereon which, when executed by a computer, will cause the computer to maintain a database including one or more digital assets and records corresponding to one or more non-digital assets. The instructions also cause the computer to provide a unified user interface for performing management functions on the digital assets and the non-digital assets identified in the database. In particular, a selection may be received via the user interface of one of the assets identified in the database. In response to the selection, a determination is made as to whether the selected asset is a digital or non-digital asset. A list of actions available to be performed on the selected asset may then be identified based upon whether the asset is a digital or a non-digital asset. A selection is then received of an action in the list and the selected action is performed on the selected asset. If the selected asset is a digital asset a workflow may be executed for performing the selected action on a digital asset and if the selected asset is a non-digital asset, a workflow may be executed for performing the selected action on a non-digital asset.

According to other embodiments of the invention, the computer-readable medium may include additional computer-executable instructions which, when executed by a computer, will cause the computer to maintain links between digital assets and records corresponding to non-digital assets in the database. Moreover, when a request is received to perform an action on a non-digital asset, a determination may be made as to whether the record corresponding to the non-digital asset is linked to a digital asset. If so, a workflow may also be executed for performing the selected action on the linked digital asset. Similarly, when a request is received to perform an action on a digital asset, a determination may be made as to whether the digital asset is linked to a record associated with a non-digital asset. If so, a workflow may also be executed for performing the selected action on the linked non-digital asset.

According to other embodiments of the invention, the computer-readable medium may include additional computer-executable instructions which, when executed by a computer, will cause the computer to periodically perform a system-initiated workflow for assets identified in the database. The workflow may be utilized, for instance, for enforcing management policies, such as a retention policy, against the assets identified in the database. The workflow may include one workflow for digital assets and another workflow for non-digital assets identified in the database.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

IV. BRIEF DESCRIPTION OF THE DRAWINGS

V. DETAILED DESCRIPTION

Figure 1:
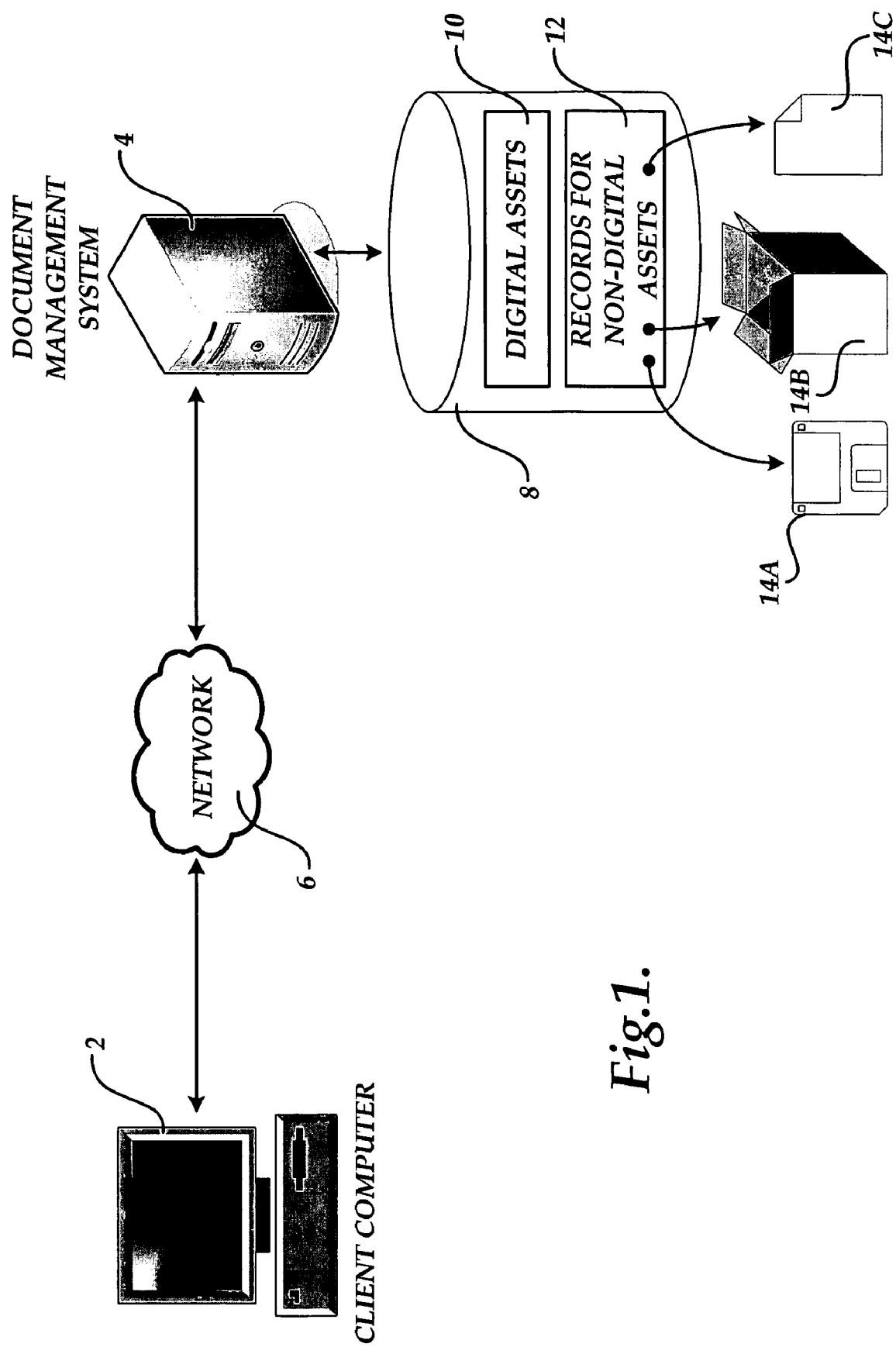
FIG. 1 is a network architecture diagram illustrating aspects of several computer systems provided and utilized in the various embodiments of the invention.

Referring now to the drawings, in which like numerals represent like elements, various aspects of the present invention will be described. In particular, FIGS. 1-2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, details regarding a client computer 2 and a document management system 4 utilized in the various embodiments of the invention will be described. In particular, the client computer 2 comprises a standard desktop, laptop, or handheld computer system operative to connect to a document management system 4 through a network 6. The client computer 2 can be utilized to create documents that may be transmitted to the document management system 4. The client computer 2 may also be utilized to access and administer the various features provided by the document management system 4. For instance, the client computer 2 may be utilized to check out a digital asset maintained by the document management system 4 for editing. Similarly, the client computer 2 may be utilized to check out a non-digital asset managed by the document management system 4. As will be described in greater detail below, these functions may be performed at the client computer 2 through an interaction with a unified user interface provided by the document management system 4 for performing functions on both digital and non-digital assets.

The document management system 4 comprises a standard server computer operative to execute an application program for performing document management functions. In particular, the document management system 4 is operative to provide a user interface through which management actions may be performed on either digital or non-digital assets maintained by the document management system 4. The user interface may be provided as a hyper-text markup language-based user interface available through a world wide web site provided by the document management system.

In conjunction with the management of both digital and non-digital assets, the document management system 4 is operative to maintain a database 8. The database 8 includes one or more digital assets 10 and records 12 corresponding to non-digital assets. The non-digital assets may comprise, for example, a floppy disk 14A, a box 14B containing documents or other items, or printed documents 14C. Records may also be maintained corresponding to any other type of non-digital item. As will be discussed in greater detail below with respect to FIG. 3, the records 12 include properties specific to non-digital assets. For instance, a field may be provided within a record 12 that identifies a physical location where a non-digital asset is stored (e.g. the warehouse, shelf, etc.). Another field may also be provided for identifying a type for the non-digital asset (e.g. whether the asset is a floppy disk, box, paper document, etc.).

In order to provide management functionality for both digital and non-digital assets, the document management system 4 allows separate workflows to be defined for performing actions on digital or non-digital items. For instance, a first workflow may be defined for checking out a copy of a digital asset. This workflow may specify that when a request is received from the client computer 2 to check out a digital asset 10 in the database 8, that a copy of the requested asset is made and e-mailed to the client computer 2. A second workflow may be defined for checking out a copy of a non-digital asset identified by a record 12 in the database 8. This workflow may specify that when a request is received from the client computer 2 to check out a non-digital asset identified by a record 12 in the database, that an e-mail message be transmitted to an employee at the location of the non-digital asset requesting that the asset be pulled and forwarded to the requesting user. By defining separate workflows for performing actions on digital and non-digital assets in this manner, the document management system 4 can provide robust functionality for both digital and non-digital assets in a manner that is virtually invisible to a user.

It should be appreciated that the management actions performed by the document management system 4 may be either user-initiated or system-initiated. User initiated actions are those initiated in response to a user request. The example provided above wherein an action is performed in response to a user requesting to check out an asset identified in the database 8 is a user-initiated action.

A system-initiated action is an action initiated programmatically by the document management system 4. System-initiated actions may be performed periodically to perform maintenance functions and to enforce management policies defined at the document management system 4. For instance, policies may be defined at the document management system 4 for retaining certain categories for specified periods of time. The document management system 4 may periodically perform management actions for enforcing the retention policy. In this regard, separate workflows may be defined for applying the policy to digital assets 10 and to non-digital assets identified by records 12 in the database. For instance, the workflow for destroying digital assets 10 may simply remove the assets from the database 8. The workflow for destroying non-digital assets identified in the database 8 may comprise transmitting an e-mail message to an employee at the location of the non-digital asset requesting that the asset be pulled and destroyed.

According to embodiments of the invention, the document management system 4 is also operative to provide functionality for linking digital assets 10 to records 12 corresponding to non-digital assets. Similarly, records 12 corresponding to non-digital assets may also be linked to digital assets 10. Linking may be utilized for instance, when digital and non-digital assets are related. Moreover, when the workflow for performing an action is performed on one type of asset, the workflow for performing the action with respect to a linked different type of asset may also be performed. For instance, if a request is received to destroy a digital asset 10, a workflow may be performed for destroying the digital asset 10. A workflow may also be performed for destroying a non-digital asset that has been linked to the digital asset. Additional details regarding this process will be provided below with respect to FIGS. 4-6.

Figure 2:
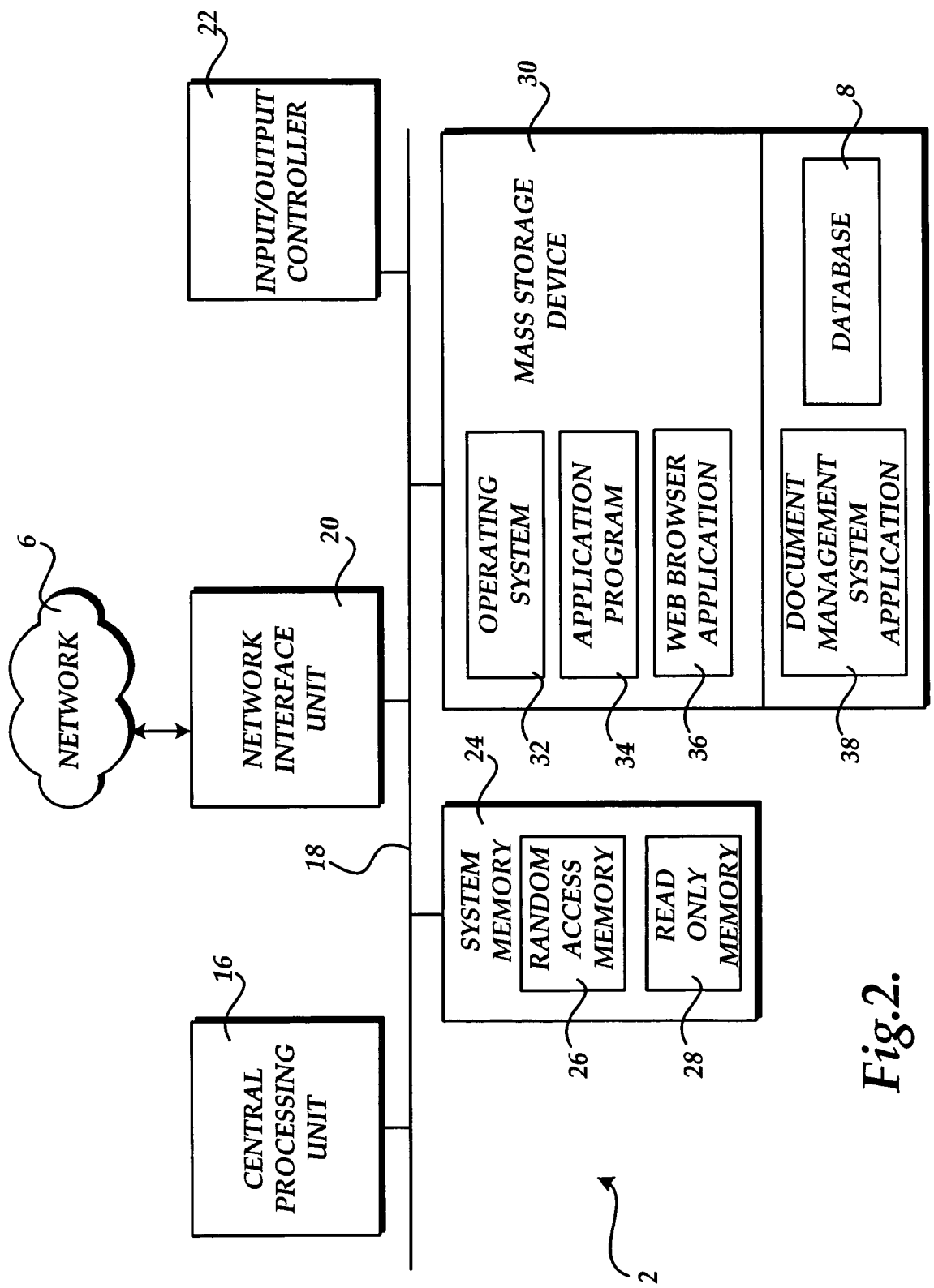
FIG. 2 is a computer system architecture diagram illustrating aspects of a computer system provided by the various embodiments of the invention.

Referring now to FIG. 2, an illustrative computer architecture for a computer 2 utilized in the various embodiments of the invention will be described. The computer architecture shown in FIG. 2 illustrates a conventional desktop or laptop computer, including a central processing unit 16 ("CPU"), a system memory 24, including a random access memory 26 ("RAM") and a read-only memory ("ROM") 28, and a system bus 18 that couples the memory to the CPU 16. A basic input/output system containing the basic routines that help to transfer information between elements within the computer, such as during startup, is stored in the ROM 28. The computer 2 further includes a mass storage device 30 for storing an operating system 32, application programs, and other program modules, which will be described in greater detail below.

The mass storage device 30 is connected to the CPU 16 through a mass storage controller (not shown) connected to the bus 18. The mass storage device 30 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 6, such as the Internet. The computer 2 may connect to the network 6 through a network interface unit 20 connected to the bus 18. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 30 and RAM 26 of the computer 2, including an operating system 32 suitable for controlling the operation of a networked personal computer, such as the WINDOWS XP operating system from MICROSOFT CORPORATION of Redmond, Wash. The mass storage device 30 and RAM 26 may also store one or more program modules. In particular, the mass storage device 30 and the RAM 26 may store one or more application programs 34. For instance, the mass storage device 30 may store a word processing application program. As known to those skilled in the art, a word processing application program is operative to provide functionality for creating and editing electronic documents. These documents may then be published to the document management system 4. The word processing application program may also be utilized to view and edit other documents stored by the document management system 4. According to one embodiment of the invention, the word processing application program 10 comprises the WORD word processing application program from MICROSOFT CORPORATION. It should be appreciated, however, that other word processing application programs from other manufacturers may be utilized to embody the various aspects of the present invention.

The mass storage device 30 and the RAM 26 may also store a web browser application 36. The web browser application 36 may be utilized to view and interact with a web site provided by the document management system 4. In particular, the document management system 4 may provide a web site for performing the management functions described herein, for configuring the operation of the document management system, and for performing other functions. The mass storage device 30 and the RAM 26 may also store an e-mail client application for sending and receiving e-mail messages to and from the document management system 4.

It should be appreciated that the document management system 4 comprises a standard server computer and that it may include some or all of the conventional computing components illustrated in and described above with respect to FIG. 2. Moreover, the document management system 38 may be operative to execute a document management system application 38 for providing the functionality described herein. In particular, the document management system application 38 is operative to provide functionality for checking assets in or out, assigning and transferring ownership of assets, expiring assets, and tracking the location of assets. Moreover, the document management system application 38 is further operative to apply policies to the contents of the database 8, such as a retention policy. In order to provide these management services, the document management system application 38 is operative to maintain a database 8, that includes digital assets 10 and records 12 corresponding to non-digital assets. Additional details regarding the structure of the records 12 will be provided below with respect to FIG. 3.

Figure 3:
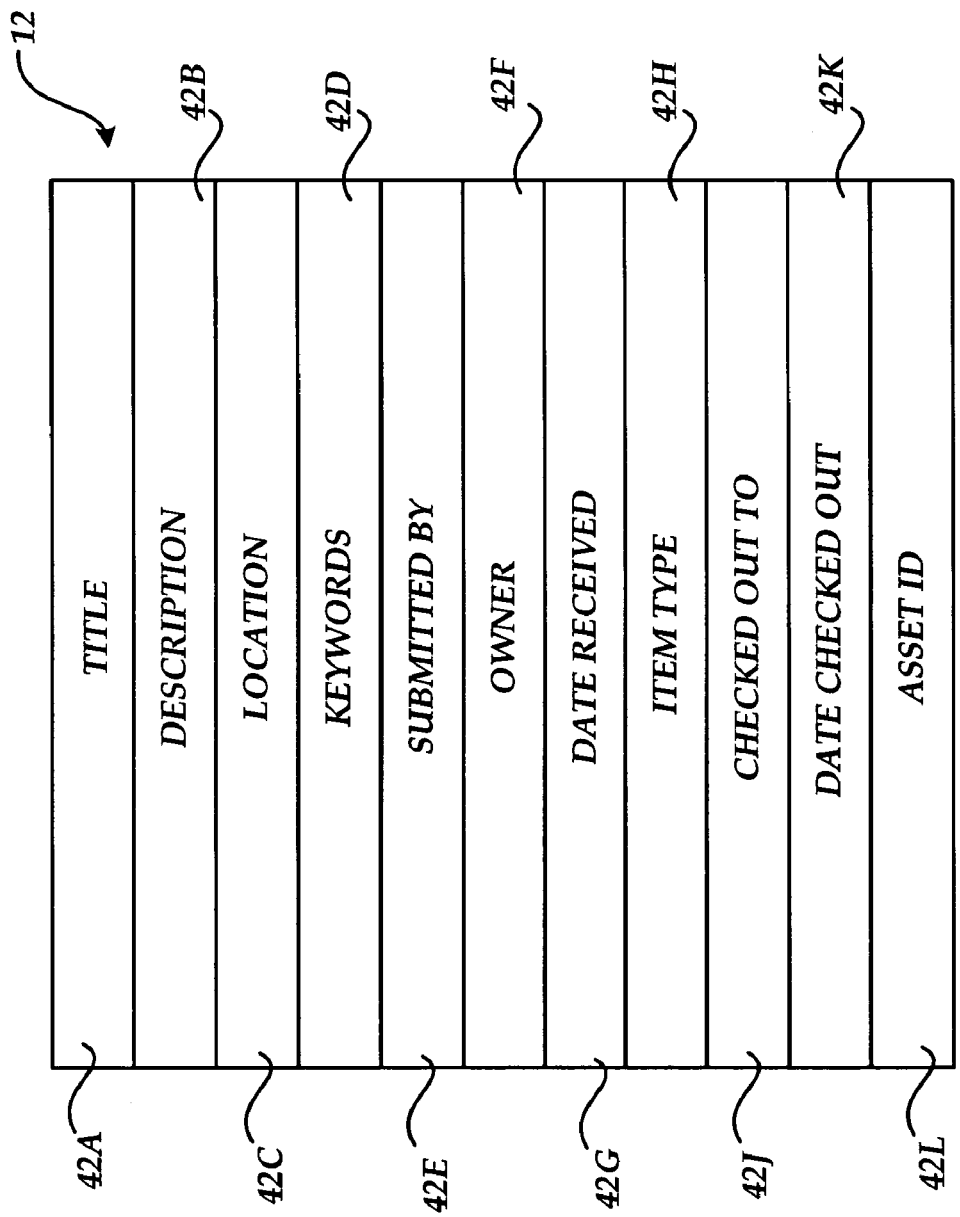
FIG. 3 is a database diagram illustrating aspects of a record corresponding to a non-digital asset utilized in one embodiment of the invention.

Turning now to FIG. 3, additional details regarding the structure of a record 12 for identifying a non-digital asset will be described. In particular, FIG. 3 is a database diagram that illustrates the various properties that are associated with a record 12 corresponding to a non-digital asset. The record 12 includes a number of fields that describe the various aspects of a non-digital asset. The field 42A is utilized to define a title for referring to the non-digital asset. The field 42B is utilized to define a detailed description of the asset (e.g. the contents of a box). The field 42C is used to specify information about the physical location at which the non-digital asset is stored. The field 42D is used to store additional terms that can be utilized to search for and locate the non-digital asset. The field 42E is utilized to identify the individual that submitted the item to the document management system 4. The field 42F is utilized to identify the person or group that owns the non-digital asset. This may be different than the identity of the individual that submitted the item to the document management system 4.

The field 42G is utilized to store data identifying the data and time the record was received. The field 42H is utilized to denote the type of the non-digital asset itself. The field 42J is utilized to denote the individual to whom the non-digital asset is checked out to. The field 42K is utilized to store the date the asset was checked out. The field 42L is used to store a unique asset identifier for the asset. For instance, this field may be utilized to store the identifier for a barcode affixed to the physical object.

Figure 4:
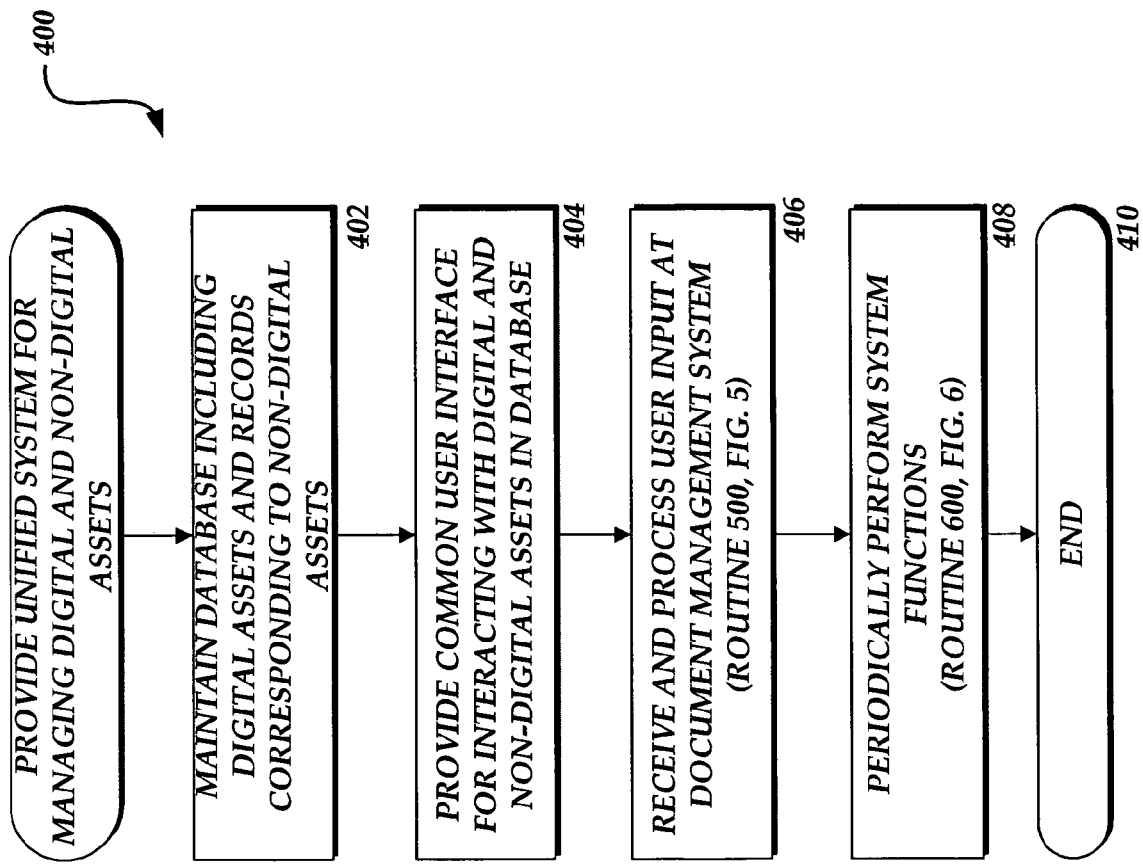
FIGS. 4-6 are flow diagrams illustrating various aspects of embodiments of the invention for providing a unified system for managing digital and non-digital assets.

Referring now to FIG. 4, an illustrative routine 400 will be described illustrating a process performed by the document management system 4 for jointly managing digital and non-digital assets. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-6, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 402, where the document management system 4 creates and maintains the database 8. As discussed above, the database 8 may include digital assets 10 and records 12 corresponding to non-digital assets 12. From operation 402, the routine 400 continues to operation 404, where the document management system 4 provides a common user interface for accessing the management functions for both digital and non-digital assets identified in the database 8. As also discussed above, the user interface may comprise a web-based interface accessible at the client computer 2 utilizing a web browser application program. Through the user interface, a user of the client computer 2 may check out assets and perform other management functions. From operation 404, the routine 400 continues to operation 406.

Figure 5:
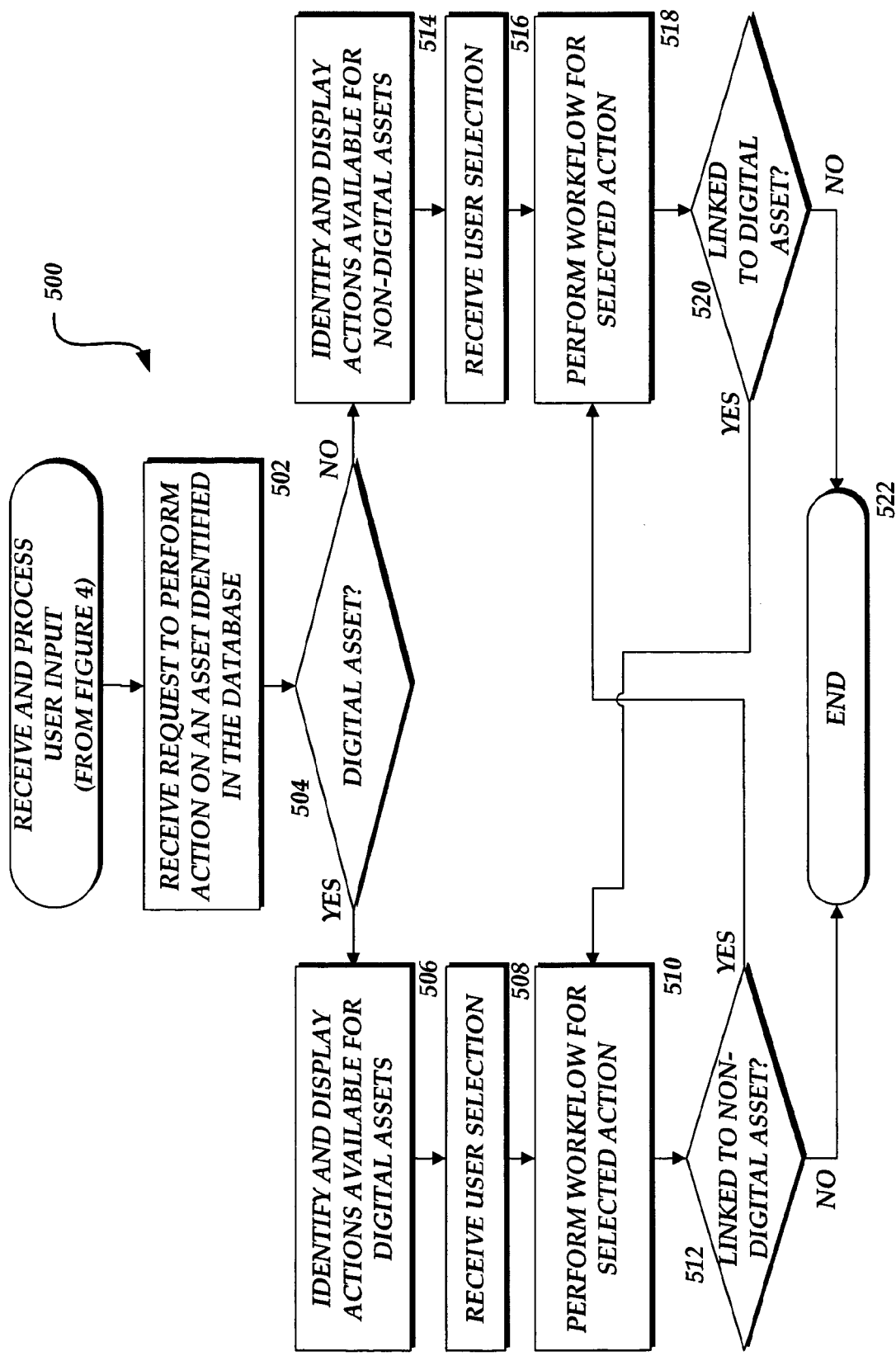
Figure 6:
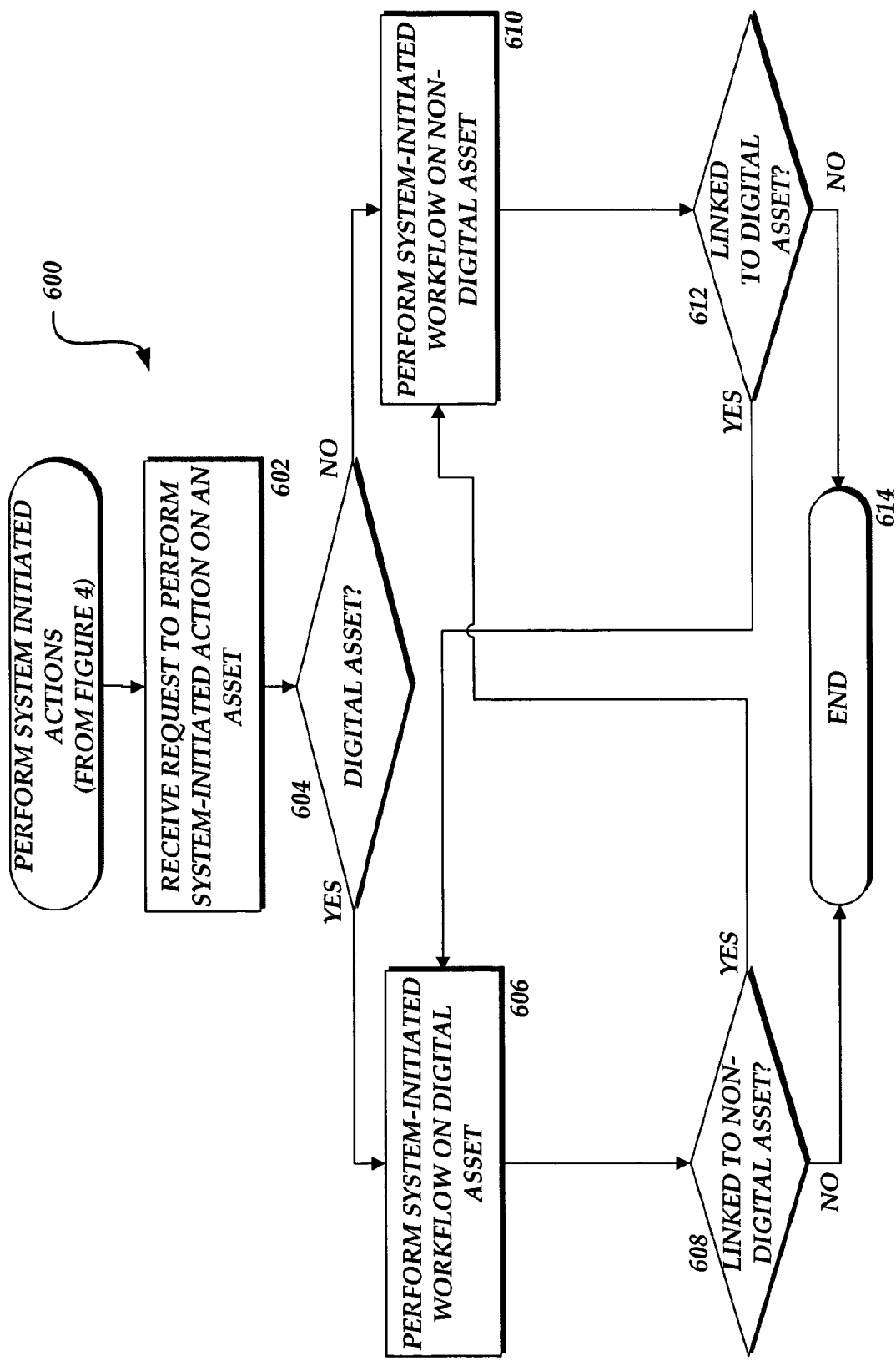

At operation 406, the document management system 4 receives and processes input received via the user interface. This process is illustrated in FIG. 5 and described in greater detail below. From operation 406, the routine 400 continues to operation 408. At operation 408, the document management system 4 periodically performs system-initiated actions. This process is illustrated in FIG. 6 and described in greater detail below. From operation 408, the routine 400 continues to operation 410, where it ends.

Referring now to FIG. 5, a routine 500 will be described for receiving and processing user input at the document management system 4. The routine 500 begins at operation 502, where a request is received to perform an action on an asset identified in the database 8. The routine 500 then continues to operation 504, where a determination is made by the document management system 4 as to whether the asset upon which the action is to be performed is a digital asset or a non-digital asset. If the asset is a digital asset, the routine 500 branches to operation 506. If the asset is a non-digital asset, the routine 500 branches to operation 514.

At operation 506, the actions that may be performed only on digital assets are identified and presented to the user. The routine 500 then continues to operation 508, where one of the identified actions is selected by the user. From operation 508, the routine 500 continues to operation 510, where the workflow is performed for the selected action on the selected digital asset. The routine 500 then continues to operation 512, where a determination is made as to whether a non-digital asset is linked to the digital asset upon which the selected workflow was performed. If the digital asset is linked to a non-digital asset, the routine 500 branches to operation 518, where the workflow is performed for the selected action on the linked non-digital asset. If the digital asset is not linked to a non-digital asset, the routine 500 continues to operation 522, where it ends.

At operation 514, the actions that may be performed only on non-digital assets are identified and presented to the user. The routine 500 then continues to operation 516, where one of the identified actions is selected by the user. From operation 516, the routine 500 continues to operation 518, where the workflow is performed for the selected action on the selected non-digital asset. The routine 500 then continues to operation 520, where a determination is made as to whether a digital asset is linked to the non-digital asset upon which the selected workflow was performed. If the non-digital asset is linked to a digital asset, the routine 500 branches to operation 510, where the workflow is performed for the selected action on the linked digital asset in the manner described above. If the non-digital asset is not linked to a digital asset, the routine 500 continues to operation 522, where it ends.

Turning now to FIG. 6, a routine 600 will be described for periodically performing system-initiated actions at the document management system 4. The routine 600 begins at operation 602, where the document management system 4 initiates the performance of an action on an asset identified in the database 8. As discussed above, such an action may be initiated to apply management policies to the assets identified in the database 8. The routine 600 then continues to operation 604, where a determination is made by the document management system 4 as to whether the asset upon which the action is to be performed is a digital asset or a non-digital asset. If the asset is a digital asset, the routine 600 branches to operation 606. If the asset is a non-digital asset, the routine 500 branches to operation 610.

At operation 606, the workflow is performed for the selected action on the selected digital asset. The routine 600 then continues to operation 608, where a determination is made as to whether a non-digital asset is linked to the digital asset upon which the system-initiated workflow was performed. If the digital asset is linked to a non-digital asset, the routine 600 branches to operation 610, where the workflow is performed for the system-initiated action on the linked non-digital asset. If the digital asset is not linked to a non-digital asset, the routine 600 continues to operation 614, where it ends.

At operation 610, the workflow is performed for the selected action on the selected non-digital asset. The routine 600 then continues to operation 612, where a determination is made as to whether a digital asset is linked to the non-digital asset upon which the system-initiated workflow was performed. If the non-digital asset is linked to a digital asset, the routine 600 branches to operation 608, where the workflow is performed for the system-initiated action on the linked digital asset. If the non-digital asset is not linked to a digital asset, the routine 600 continues to operation 614, where it ends.

Based on the foregoing, it should be appreciated that the various embodiments of the invention include a method, system, apparatus, and computer-readable medium for jointly managing digital and non-digital assets. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing assets, the method comprising:
   maintaining a database comprising at least one digital asset and at least one record corresponding to at least one non-digital asset, wherein the at least one digital asset comprises at least one editable electronic document comprising information unrelated to identifying and tracking the at least one non-digital asset;

maintaining a link in the database between the at least one digital asset and the at least one record corresponding to the at least one non-digital asset when the at least one digital asset and the at least one non-digital asset are related;

receiving a request to perform an action on one from a group consisting of the at least one digital asset identified in the database and the at least one non-digital asset identified in the database;

determining, in response to receiving the request, whether the request is to perform the action on the one from the group consisting of the at least one digital asset and the at least one non-digital asset;

when it is determined that the request is to perform the action on the at least one digital asset,
      performing a first workflow on the at least one digital asset, wherein the first workflow causes the action to be performed on the at least one digital asset,
      after performing the first workflow on the at least one digital asset, determining if the at least one digital asset upon which the first workflow was performed is linked to the at least one record corresponding to the at least one non-digital asset, and
      when it is determined that there is the link in the database between the at least one digital asset and the at least one record corresponding to the at least one non-digital asset, performing a second workflow on the linked at least one non-digital asset, wherein the second workflow causes the action to be performed on the at least one non-digital asset; and when it is determined that the request is to perform the action on the at least one non-digital asset,
      performing the second workflow on the at least one non-digital asset,
      after performing the second workflow on the at least one non-digital asset, determining if the at least one record corresponding to the at least one non-digital asset upon which the second workflow was performed is linked to the at least one digital asset, and
      when it is determined that there is the link in the database between the at least one digital asset and the at least one record corresponding to the at least one non-digital asset, performing the first workflow on the linked at least one digital asset.

2. The method of claim 1, farther comprising after determining, in response to receiving the request, whether the request is to perform the action on the one from the group consisting of the at least one digital asset and the at least one non-digital asset, in response to determining that the request is to perform the action on the at least one non-digital asset, identifying possible actions that are performed on the at least one non-digital asset and receiving a selection of the action to be performed from the identified possible actions.

3. The method of claim 1, wherein the received request to perform the action is user-initiated.

4. The method of claim 1, wherein the received request to perform the action is initiated by a computer system.

5. A computer-readable storage medium having computer-executable instructions stored thereon which, when executed by a computer, will cause the computer to:
   maintain a database comprising at least one digital asset and at least one record corresponding to at least one non-digital asset, wherein the at least one digital asset comprises at least one editable electronic document comprising information unrelated to identifying and tracking the at least one non-digital asset;

maintain a link in the database between the at least one digital asset and the at least one record corresponding to the at least one non-digital asset when the at least one digital asset and the at least one non-digital asset are related;

receive a request to perform an action on one from a group consisting of the at least one digital asset identified in the database and the at least one non-digital asset identified in the database;

determine, in response to receiving the request, whether the request is to perform the action on the one from the group consisting of the at least one digital asset and the at least one non-digital asset;

when it is determined that the request is to perform the action on the at least one digital asset, perform a first workflow on the at least one digital asset, wherein the first workflow causes the action to be performed on the at least one digital asset, after performing the first workflow on the at least one digital asset, determine if the at least one digital asset upon which the first workflow was performed is linked to the at least one record corresponding to the at least one non-digital asset, and when it is determined that there is the link in the database between the at least one digital asset and the at least one record corresponding to the at least one non-digital asset, perform a second workflow on the linked at least one non-digital asset, wherein the second workflow causes the action to be performed on the at least one non-digital asset; and when it is determined that the request is to perform the action on the at least one non-digital asset, perform the second workflow on the at least one non-digital asset, after performing the second workflow on the at least one non-digital asset, determine if the at least one record corresponding to the at least one non-digital asset upon which the second workflow was performed is linked to the at least one digital asset, and when it is determined that there is the link in the database between the at least one digital asset and the at least one record corresponding to the at least one non-digital asset, perform the first workflow on the linked at least one digital asset.

6. The computer-readable storage medium of claim 5, wherein the received request to perform the action is user-initiated.

7. The computer-readable storage medium of claim 5, wherein the received request to perform the action is initiated by a computer system.

8. A system for managing assets, the system comprising:
a memory storage; and
a processing unit coupled to the memory storage, where the processing unit:

maintains a database comprising at least one digital asset, wherein the at least one digital asset comprises at least one editable electronic document comprising information unrelated to identifying and tracking the at least one non-digital asset and at least one record corresponding to at least one non-digital asset;

maintains a link in the database between the at least one digital asset and the at least one record corresponding to the at least one non-digital asset when the at least one digital asset and the at least one non-digital asset are related;

receives a request to perform an action on one from a group consisting of the at least one digital asset identified in the database and the at least one non-digital asset identified in the database wherein the request to perform the action is user-initiated;

determines, in response to receiving the request, whether the request is to perform the action on the one from the group consisting of the at least one digital asset and the at least one non-digital asset;

when it is determined that the request is to perform the action on the at least one digital asset, performs a first workflow on the at least one digital asset, wherein the first workflow causes the action to be performed on the at least one digital asset, after performing the first workflow on the at least one digital asset, determine if the at least one digital asset upon which the first workflow was performed is linked to the at least one record corresponding to the at least one non-digital asset, and when it is determined that there is the link in the database between the at least one digital asset and the at least one record corresponding to the at least one non-digital asset, performs a second workflow on the linked at least one non-digital asset, wherein the second workflow causes the action to be performed on the at least one non-digital asset; and when it is determined that the request is to perform the action on the at least one non-digital asset, performs the second workflow on the at least one non-digital asset, after performing the second workflow on the at least one non-digital asset, determines if the at least one record corresponding to the at least one non-digital asset upon which the second workflow was performed is linked to the at least one digital asset, and when it is determined that there is the link in the database between the at least one digital asset and the at least one record corresponding to the at least one non-digital asset, performs the first workflow on the linked at least one digital asset.

* * * * *

UNITED STATES PATENT AND TRADEMARK OFFICE
CERTIFICATE OF CORRECTION

| | | |
|---|---|---|
| PATENT NO. | : 7,636,723 B2 | Page 1 of 1 |
| APPLICATION NO. | : 11/123434 | |
| DATED | : December 22, 2009 | |
| INVENTOR(S) | : Kevin L. Brown et al. | |

It is certified that error appears in the above-identified patent and that said Letters Patent is hereby corrected as shown below:

In column 10, line 48, in Claim 2, delete "farther" and insert -- further --, therefor.

Signed and Sealed this
Twenty-fifth Day of January, 2011

David J. Kappos
*Director of the United States Patent and Trademark Office*